C. G. FREUDINGER.
COMBINATION TOOL.
APPLICATION FILED MAR. 16, 1914.
1,132,252.
Patented Mar. 16, 1915.
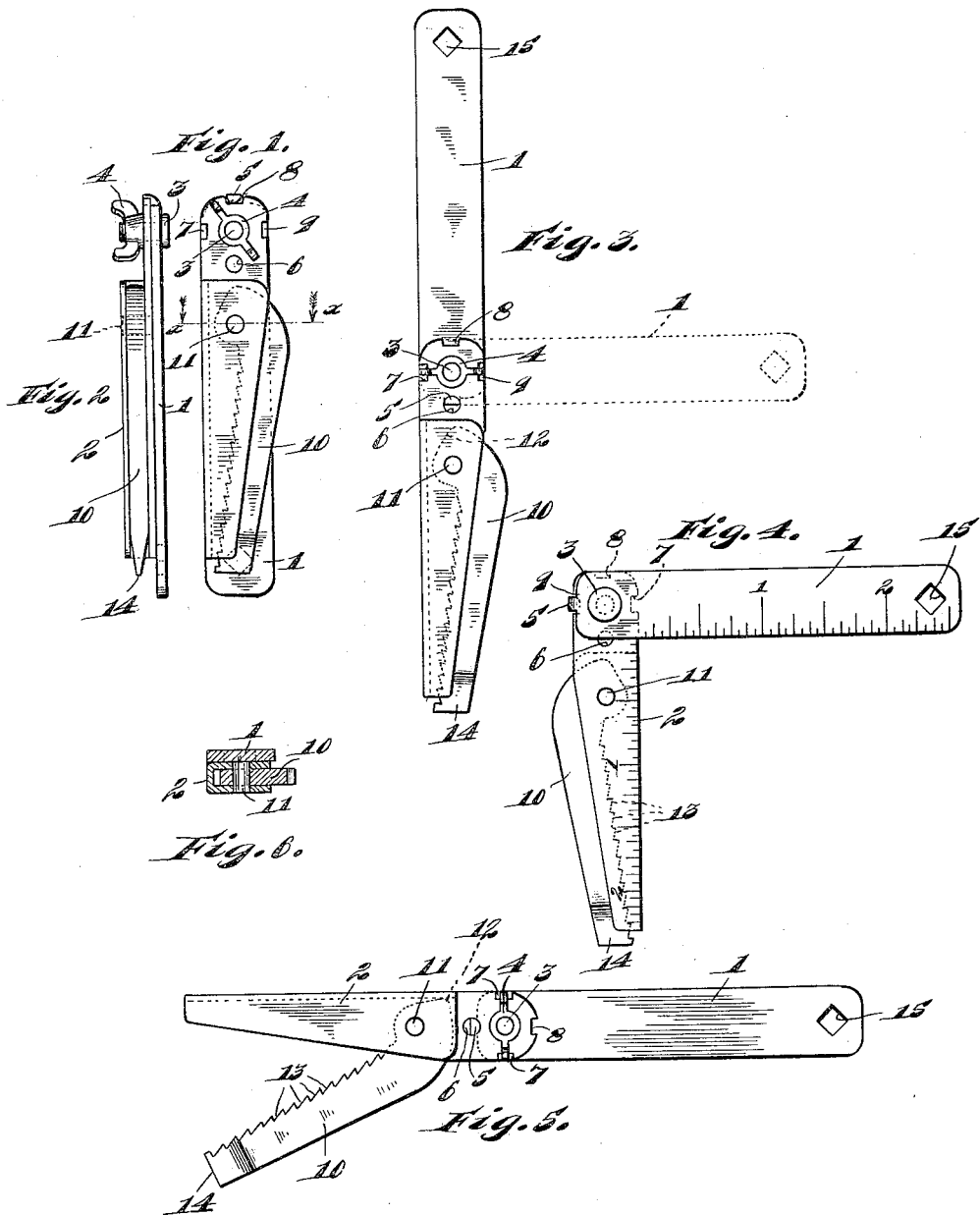

UNITED STATES PATENT OFFICE.

CHARLES G. FREUDINGER, OF CHICAGO, ILLINOIS.

COMBINATION-TOOL.

1,132,252.  Specification of Letters Patent.  Patented Mar. 16, 1915.

Application filed March 16, 1914. Serial No. 825,062.

*To all whom it may concern:*

Be it known that I, CHARLES G. FREUDINGER, a citizen of the United States, and a resident of the city of Chicago, county of Cook, and State of Illinois, have invented certain new and useful Improvements in Combination-Tools, of which the following is a specification.

My invention relates to a combination tool that is a tool adapted to be adjusted so as to serve in a variety of different capacities.

This application is the parent case to a divisional application, Serial No. 854,052, filed July 30, 1914, for screw drivers.

The object of my invention is the production of a tool as mentioned which will be of durable and economical construction and efficient in use.

Other objects will appear hereinafter.

The invention consists in the combinations and arrangements of parts hereinafter described and claimed.

The invention will be best understood by reference to the accompanying drawing forming a part of this specification, and in which, Figure 1 is a front elevation of a combination tool embodying my invention, the same being shown in collapsed or folded condition, Fig. 2 is a side view of the folded tool, Figs. 3, 4 and 5 are front elevations of the tool in various positions of adjustment, and Fig. 6 is a detail section taken on line x—x of Fig. 1.

The preferred form of construction as illustrated in the drawing comprises an elongated substantially rectangular handle 1 formed of metal, at one end of which is arranged an elongated channel member 2 pivotally secured to the handle 1 by means of a screw 3 and coöperating thumb nut 4. The handle 1 is releasably locked in positions of pivotal adjustment relative to the channel member 2 by means of a finger 5 formed at the pivoted end of said handle which is adapted to engage any one of a plurality of recesses or notches 6, 7, 8 and 9 which are provided at the adjacent end of member 2. The arrangement is such, as will be seen, that the finger 5 is releasably locked in engagement with one of said recesses or notches by tightening of the thumb nut 4, disengagement of said finger from the recess engaged thereby in order to effect adjustment of the handle, being secured through first loosening of said thumb nut whereupon the members 1 and 2 may be spaced or moved apart sufficiently to effect disengagement of finger 5 from the notch engaged thereby.

Coöperating with the channel member 2 is an elongated bar 10, one end of which is pivotally connected with said channel member adjacent the pivoted end thereof at 11. The connection between said members 2 and 10 is such that the latter may be folded to position in the channel in the former as shown in Figs. 1, 3 and 4, or rocked outwardly to extend angularly from said channel member, as shown in Fig. 5. Outward rocking of said member 10 is limited by an extension or stop 12 provided at the inner end thereof which is adapted to engage against the bottom of the channel in member 2. Formed in the inner longitudinal edge of bar 10 are teeth 13 which adapt the device, when the bar 10 is in the position shown in Fig. 5, for use as an alligator wrench, or bottle opener, as will be readily understood.

The outer end of bar 10 is tapered as at 14 in order to constitute a screw driver point, the device being used in this capacity when the member 10 is in position in the channel member 2 since, in the latter position of said member 10, the sides of the channel will reinforce the same in the screw driving operation.

Through the pivotal adjustments permitted the handle 1, if enough leverage cannot be developed to operate the screw driver with the handle 1 in the position shown in full lines in Fig. 3, said handle may be adjusted to the position shown in dotted lines in said figure, in which event more leverage will be developed so as to facilitate the rotation or operation of the screw driver. When the finger 5 is in engagement with the recess 9, the handle 1 is so disposed relative to the member 2 that the inner longitudinal edges of said members are disposed at right angles to each other in order to adapt the same for service as a square. Said edges are also provided with graduations in order to adapt the same for service as a scale. The outer end of handle 1 is provided with an opening 15 which affords means for fastening the tool to a key ring or chain as desired. Said opening 15 is preferably square, as shown, in order to adapt the device for service as a key for operating a gas tank valve or other square stem of proper size.

When the device is not in use, the same may be folded into compact form as shown in Figs. 1 and 2, the parts 1 and 2 being releasably locked in folded position by engagement of the finger 5 with the recess 8. When the device is in folded or closed condition, the same occupies a very small space, so as to adapt the device to be readily carried in the pocket.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A tool of the class described comprising a handle; a channel shaped jaw on said handle; a jaw pivoted at one end to said channel shaped jaw for coöperation therewith; and an extension on said last mentioned jaw engaging the bottom of the channel of said channel shaped jaw for locking said jaws in operative condition, substantially as described.

2. A tool of the class described comprising a handle; a channel shaped jaw adjustably secured to said handle; a jaw pivoted at one end in said channel shaped jaw and coöperating therewith, there being teeth on the inner side of said last mentioned jaw; and an extension on said last mentioned jaw engaging the bottom of the channel of said channel shaped jaw locking said jaws in operative condition, substantially as described.

3. A tool of the class described comprising a channel shaped jaw; a handle having one end pivotally connected with one end of said jaw; means for locking said handle in positions of pivotal adjustment relative to said jaw; an elongated jaw having one end pivotally connected with said channel shaped jaw adjacent said before mentioned end thereof so as to permit of rocking of the opposite end of said jaw outwardly or inwardly to position in the channel of said channel shaped jaw; means for limiting the outward rocking of said elongated jaw; and teeth provided upon the inner longitudinal edge of said last mentioned jaw, substantially as described.

4. A tool of the class described comprising a channel shaped jaw; a handle having one end pivotally connected with one end of said jaw; means for locking said handle in positions of pivotal adjustment relative to said jaw, said means comprising a finger at the pivoted end of said handle adapted to engage anyone of a plurality of recesses provided in the adjacent end of said jaw; means for releasably locking said finger in engagement with said notches; an elongated jaw having one end pivotally connected with said channel shaped jaw adjacent said first mentioned end thereof so as to permit of rocking of the opposite end of said last mentioned jaw outwardly or inwardly to position in the channel of said channel shaped jaw; means for limiting the outward rocking of said last mentioned jaw; and teeth provided upon the inner longitudinal edge of said last mentioned jaw, substantially as described.

5. A tool of the class described comprising a channel shaped jaw; a handle having one end pivotally connected with one end of said jaw; means for locking said handle in positions of pivotal adjustment relative to said jaw, said means comprising a finger at the pivoted end of said handle adapted to engage anyone of a plurality of recesses provided in the adjacent end of said jaw; a thumb nut for releasably locking said finger in engagement with said notches; an elongated jaw having one end pivotally connected with said channel shaped jaw adjacent said first mentioned jaw thereof so as to permit of rocking of the opposite end of said last mentioned jaw outwardly or inwardly to position in the channel of said channel shaped jaw; means for limiting the outward rocking of said last mentioned jaw: and teeth provided upon the inner longitudinal edge of said last mentioned jaw, substatially as described.

In testimony whereof I have signed my name to this specification in the presence of two subscribing witnesses.

CHARLES G. FREUDINGER.

Witnesses:
 JOSHUA R. H. POTTS,
 JANET E. FARRELL.

Copies of this patent may be obtained for five cents each, by addressing the "Commissioner of Patents, Washington, D. C."